Jan. 19, 1954    G. T. BAKER    2,666,540
EXTENSION UNIT FOR TRACTOR OPERATED LOADING ATTACHMENTS
Filed Sept. 19, 1951    2 Sheets-Sheet 1
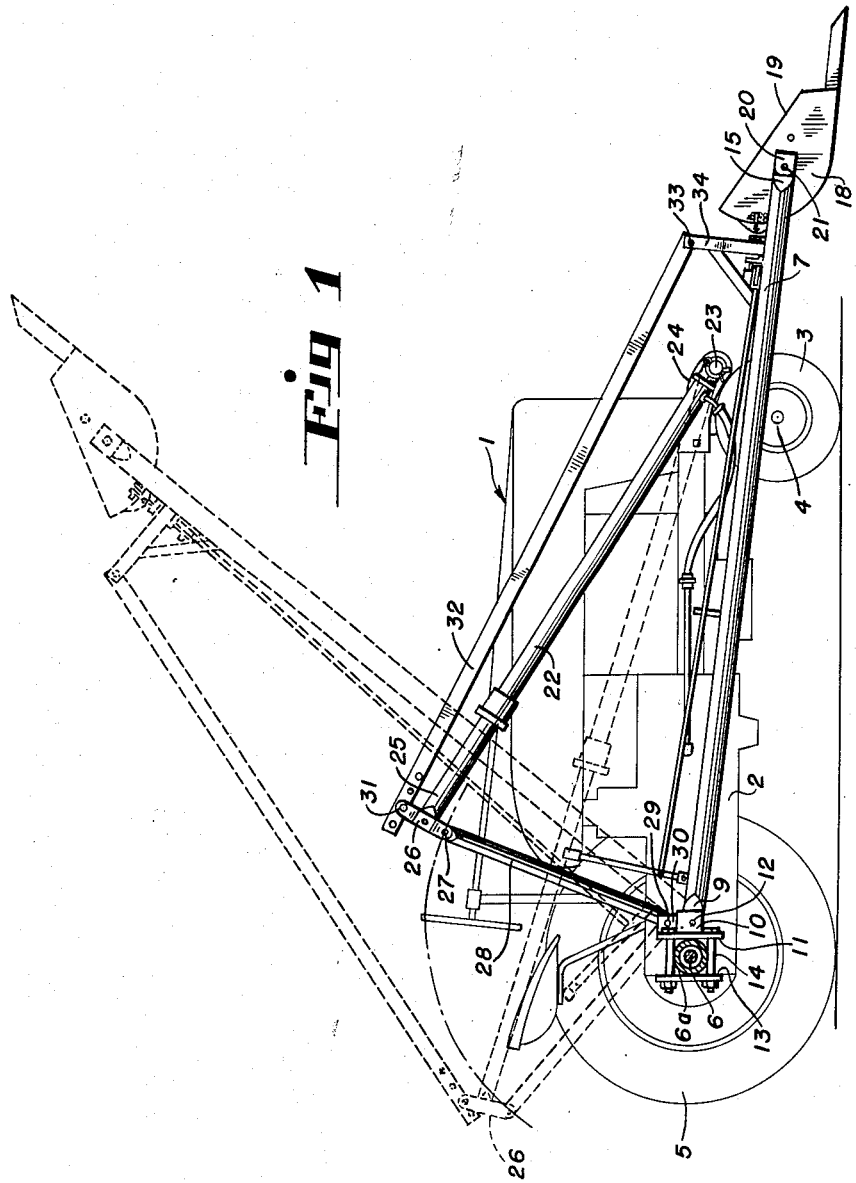
INVENTOR.
GERALD T. BAKER.
BY
ATTORNEY.

Jan. 19, 1954  G. T. BAKER  2,666,540
EXTENSION UNIT FOR TRACTOR OPERATED LOADING ATTACHMENTS
Filed Sept. 19, 1951  2 Sheets-Sheet 2
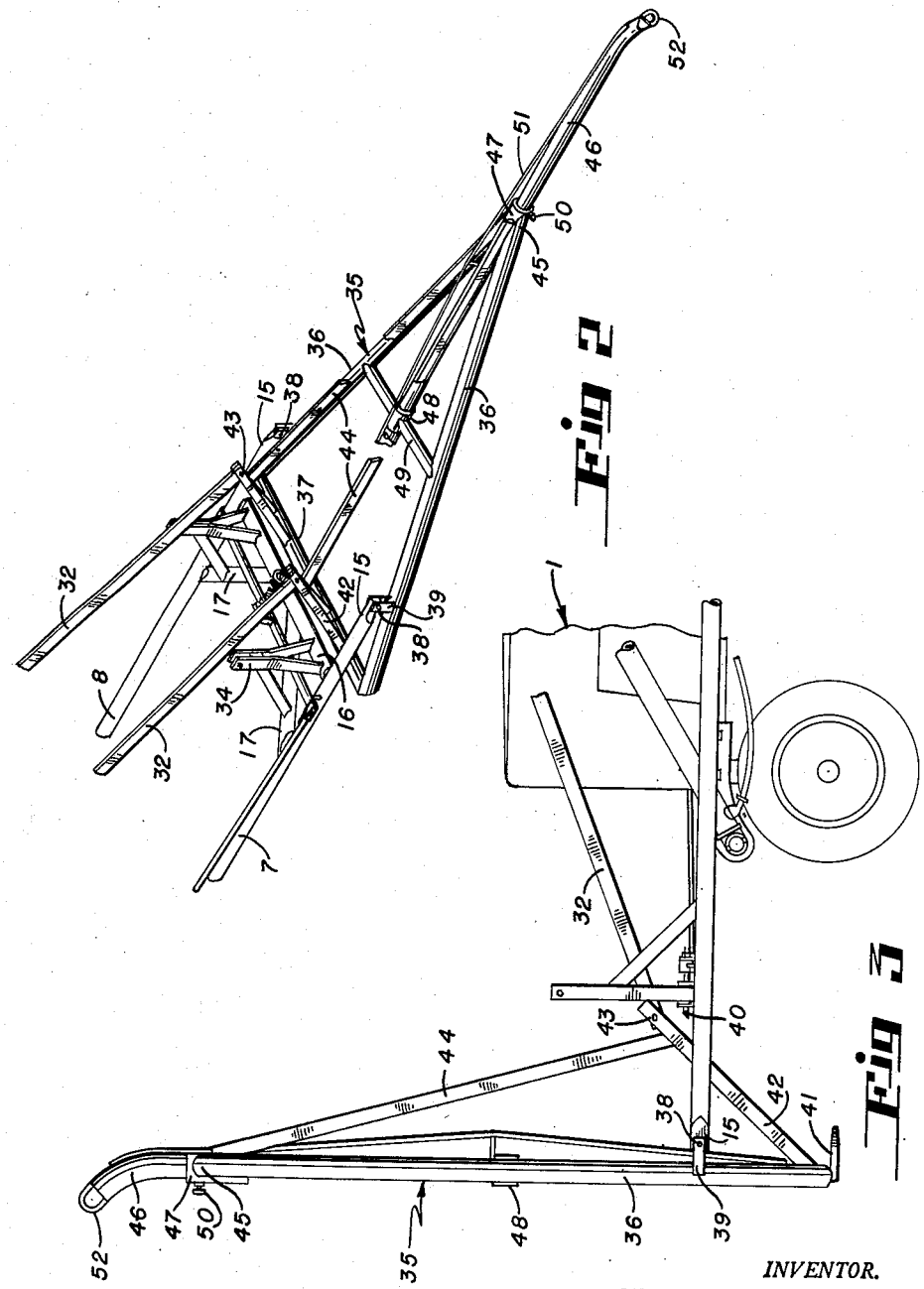
INVENTOR.
GERALD T. BAKER.
BY
*Alden D. Redfield*
ATTORNEY.

UNITED STATES PATENT OFFICE 2,666,540

EXTENSION UNIT FOR TRACTOR OPERATED LOADING ATTACHMENTS

Gerald T. Baker, Fort Dodge, Iowa

Application September 19, 1951, Serial No. 247,209

4 Claims. (Cl. 214—149)

This invention relates generally to a tractor operated loading device, and in particular to a forward extension unit and an associated extensible boom for a farm tractor loading attachment to facilitate the handling of hay and similar materials.

An object of this invention is to provide an improved tractor operated loading device.

Another object of this invention is the provision of a forward extension unit pivotally connected to a tractor loading attachment, the extension unit being movable to a load carrying position in substantial longitudinal alignment with the longitudinal axis of the loading attachment, and to an upright transport position substantially perpendicular to the loading attachment.

A further object of the present invention is the provision of an extensible boom for the extension unit.

According to the present invention, an extension unit comprising a rigid triangular framework is pivotally secured to the forward ends of a pair of lifting arms which constitute part of a loading attachment which is operated by hydraulic cylinders, the lifting arms being movable between a horizontal and an elevated position during use. The triangular framework engages the underside of the lifting arms and is releasably latched thereto to form a projecting forward extension for the attachment. An extensible boom is telescoped within the framework and may be extended to increase the effective length of the framework and, consequently, that of the entire loading attachment.

The novel features that are considered characteristic of the invention are set forth in the appended claims; the invention itself, however, both as to its organization and method of operation, together with additional objects and advantages thereof, will best be understood from the following description of a preferred embodiment when read in conjunction with the accompanying drawings, in which:

Figure 1 is a side elevational view of a loading attachment shown in assembled relationship with a tractor, with parts broken away and in section to facilitate illustration of the structure;

Figure 2 is a perspective view of an extension unit adapted to be secured to the forward end of the loading attachment, a portion of the forward end being shown in this figure; and Figure 3 is a side elevational view of the extension unit of Figure 2 illustrated in assembled relationship with the front portion of a tractor and shown in its transport position.

With reference to Figure 1, the loading attachment is shown in assembled relationship with a tractor, generally designated 1, including a frame 2, dual front wheels 3 supported on an axle 4, and rear traction wheels 5 carried on an axle 6.

The loading attachment includes a pair of pivoted lifting arms 7 and 8 arranged at opposite sides of the tractor. The lifting arms are of pipe construction and are formed with flat rear ends 9, supported between spaced supports 10 projecting forwardly from a front clamp plate 11 and pivoted on a pin 12 carried by supports 10. Clamp plate 11 and rear clamp plate 13 engage opposite sides of rear axle housing 6a and are held in engagement therewith by bolts 14.

The lifting arms 7 and 8 extend forwardly of the tractor and are connected together near their front ends 15 by a transverse member 16, suitably braced with the arms by brace members 17. The front ends 15 are flattened and adapted to be received between an adjacent side wall 18 of a scoop 19 and one of the legs 20 of L-shaped brackets projecting laterally outwardly from the scoop walls 18. Pins 21 pivotally support the scoop for movement between the lifting arms.

The lifting arms are raised and lowered by a pair of upwardly and rearwardly inclined hydraulic cylinders 22, pivotally mounted at their lower ends on a transverse bar 23 supported in front of the tractor by brackets 24 secured to the tractor frame 2. The cylinders 22 are connected through suitable conduits and control valves to an oil pump which may constitute a part of the tractor for operating fluid-pressure-operated tractor attachments. The conduits, pump, and associated control valves have not been illustrated since they do not constitute any part of the present invention.

Piston rods 25, which are slidably retained in hydraulic cylinders 22, carry cross members 26 at their free ends as illustrated in Figure 1. The lower ends of the cross members are pivotally connected by pins 27 with the upper ends of guide members 28, while the lower ends of the guide members are pivotally secured by pins 29 to supports 30 which extend forwardly from the front clamp plates 11. The pivot pins 29 for the guide members 28 are spaced above and inwardly of the lifting arm pivots 12 to assure clearance between the guide members and the rear tractor axle housing when the loading attachment is moved to an elevated position.

The upper ends of cross arms 26 are pivoted at 31 to the rear ends of upwardly and rearwardly inclined lifting rods 32, the lower or forward ends of the rods being pivotally attached at 33 to upright members 34 secured to the opposite ends of transverse member 16. The associated lifting rods, guide members, and hydraulic cylinder assemblies are positioned in common vertical longitudinal planes at each side of the tractor inwardly of the lifting arms 7 and 8, the vertical planes being parallel to the longitudinal axis of the tractor.

When fluid pressure is supplied to the cylinders 22, the piston rods 25 are moved rearwardly, exerting lifting forces on the lifting arms 7 and 8 through the lifting rods 32 and uprights 34, guide members 28 guiding the pivotal movement of the cylinders 22 about their lower pivotal attachments to the tractor.

When the fluid pressure is released from the hydraulic cylinders, the lifting arms return to their lowermost positions by the force of gravity. It is to be understood, however, that the arms may be moved to any elevated position between the full line and dotted line positions illustrated in Figure 1, and then may be held at such elevated position by the actuation of an associated control valve for regulating the flow of fluid to cylinders 22.

The scoop 19, pivotally attached to the forward ends of lifting arms 7 and 8, does not comprise any part of the present invention and consequently will not be described in detail. The construction and operation of the scoop and the before-described loading attachment are fully disclosed and claimed in the Baker Patent 2,583,079 issued on January 22, 1952, on a Loading Machine. It is sufficient for the present purposes to understand the overall operation of the loading mechanism and that the scoop may be removed whenever desired to permit the attachment of a forward extension unit to adapt the loading attachment for use in lifting hay and similar materials to great heights.

The forward extension unit, generally designated 35, is shown in perspective in Figure 2 pivotally attached to the forward ends 15 of lifting arms 7 and 8. The extension unit includes a triangular shaped frame having side members 36 and a base member 37 of tubular pipe construction. The extension is pivotally supported on pins 38 mounted in the front ends 15 of the lifting arms and extending through upright projections 39 oppositely arranged on the side members 36 forwardly of the base 37. As a result, the extension unit is pivotally supported on the lifting arms for pivotal movement, being in substantial longitudinal alignment with the lifting arms in its lowered position, this position being determined by the engagement of base member 37 with the undersides of the lifting arms, as illustrated in Figure 2.

The extension unit 35 is releasably held in its load-carrying position by a latching mechanism, including a latch pin 40 and an upright loop-shaped member 41 secured to the top of base member 37.

Inclined upwardly and forwardly from the base member, when the extension unit 35 is in its load-carrying position, are a pair of transversely spaced cantilever members 42. The lifting rods 32, associated with the hydraulic cylinders, are pivotally connected, as at 43, to the upper ends of the cantilever members 42 having previously been disconnected from uprights 34. Braces 44 are connected between the projecting ends of members 42 and the apex or front end 45 of the extension unit frame.

A boom 46 of tubular construction is slidably supported for fore and aft longitudinal movement at the forward end of the extension unit frame. The slidable support for the boom includes a tubular sleeve 47 at the apex 45 and another tubular sleeve 48 formed as part of a transverse member 49 extending between side members 36 intermediate their ends. The boom is held in any preselected longitudinal position by a lock screw 50 threadedly secured in sleeve 47 for engagement with boom 46. A strengthening truss rod 51 is connected between the ends of the boom in clearance relationship with sleeves 47 and 48. A loop or hitch ring 52, at the forward end of the boom, is adapted for connection to a load carrying unit such as a hay fork or grappling hook.

In operation, the extension unit is normally used in the position shown in Figure 2 with the boom extended a distance providing for a desired elevation of the load-carrying unit supported on the hitch ring 52. Latch pin 40 is fully engaged with loop 41 so that the extension unit is maintained in its position of use with the base member 37 bearing against the underside of lifting arms 7 and 8. The loading attachment may then be operated in its usual fashion, the hydraulic cylinders and associated piston rods imparting raising and lowering movements to the lifting rods and lifting arms which transfer these movements to the forward extension unit, boom, and associated load-carrying unit. As will be appreciated by those skilled in the art, the extension unit may be raised and lowered by the loading attachment to permit the transfer of hay and similar materials to and from high places such as the tops of haystacks.

On completion of the loading of hay or the like on a hayrack, the tractor on which the attachment is mounted may be used to pull the loaded hayrack to any desired location. To facilitate the use of the tractor for this purpose, the extension unit 35 is moved to a substantially upright transport position as illustrated in Figure 3. Movement to this upright position can be attained merely by releasing the latch pin 40 which permits the lifting arms 7 and 8 to move downwardly under the force of gravity. By virtue of the pivoted connection at 43 between the extension unit and the lifting rods, this downward movement of the lifting arms automatically results in an upward movement of the extension unit about pivots 38. This movement continues until the pivots 38 and 43 are in alignment with the lifting arms, as illustrated in Figure 3. In this aligned position, the weight of the lifting arms is rendered ineffective to move the extension unit further. Likewise, on operation of the hydraulic cylinders, the line or direction of the raising force applied through the lifting rods 32 extends through the pivots 38 and 43 so that the extension unit remains in its transport position on elevation of the lifting arms 7 and 8. It is thus seen that the extension unit is automatically moved to its transport position simply by releasing the latch pin 40.

When the loaded hayrack has been moved to its destination, the tractor with attachment thereon, is disconnected from the hayrack, and the extension unit is manually moved from its transport position shown in Figure 3 to its load-carrying position shown in Figure 2, whereby the extension is readily made available for unloading the hay from the hayrack.

It will be readily appreciated by those skilled in the art that the extension unit can be easily removed from the loading attachment, and the scoop 19 can be re-assembled with the loading attachment to restore it to its original condition.

In view of the foregoing description, it is apparent that the present invention provides an extension unit for pivotal connection to a tractor loading attachment which forms a rugged extension for the loading attachment when in its lowered position and which also can be used in an upright transport position for moving hayracks and similar load-carrying devices from place to place.

Having described a preferred embodiment of my invention, I claim:

1. In combination in an extension unit for use with a tractor loading attachment including a pair of parallel longitudinally extending lifting arms and upwardly and rearwardly inclined lifting rods disposed above said lifting arms for cooperative movement therewith in response to the operation of associated hydraulic actuating cylinders, a triangular tubular framework pivotally secured to the outstanding ends of the lifting arms, said frame including a transverse base member engaging the undersides of the lifting arms when said framework is in substantial longitudinal alignment with the lifting arms, latching means associated with the loading attachment and framework to releasably secure said framework in its longitudinally extended position, members secured to and projecting upwardly from said base member of said framework, the lifting rods of the loading attachment being pivotally secured to the outstanding ends of said upwardly projecting members, an extensible tubular boom slidably secured within said framework for increasing its effective length and a hitching ring secured to the projecting end of said extensible boom.

2. An extension unit for a tractor operated loading attachment comprising an elongated triangular framework including side members joined at a common apex and a transverse base member secured to and extending between said side members at points remote from the apex, pivotal mounting means extending perpendicularly from the top of said framework for pivotally securing said framework to the loading attachment, said transverse base member engaging the undersides of the loading attachment when said framework is in extended position relative thereto, a tubular sleeve secured to the apex of said framework, transverse means including a second tubular sleeve extending between said side members of said framework at a point spaced from said first named tubular sleeve, an extensible boom slidably supported by said first and second named tubular sleeves, means associated with said framework to secure said boom in a preselected position, and hitching means at the end of said boom projecting from said framework.

3. In combination in an extension unit for use with a tractor loading attachment, including a pair of parallel longitudinally extending lifting arms and upwardly and rearwardly inclined lifting rods disposed above said lifting arms for cooperative movement therewith in response to the operation of associated hydraulic actuating cylinders, a triangular tubular framework including side members joined at a common apex, said framework being pivotally secured to the outstanding ends of the lifting arms, said framework including a transverse base member engaging the under sides of the lifting arms when said framework is in substantial longitudinal alignment with the lifting arms, latching means associated with the loading attachment and framework to releasably secure said framework in its longitudinally extended position, members secured to and projecting upwardly from said base member of said framework, the lifting rods of the loading attachment being pivotally secured to the outstanding ends of said upwardly projecting members, a tubular sleeve secured to the apex of said triangular framework, transverse means including a second tubular sleeve extending between said side members of said framework at a point spaced from said first named tubular sleeve, and an extensible boom slidably supported by said first and second named tubular sleeves, means associated with said framework to secure said boom in a preselected position, and hitching means at the end of said boom projecting from said framework.

4. In combination in an extension unit for use with a tractor loading attachment including a pair of parallel longitudinally extending lifting arms and upwardly and rearwardly inclined lifting rods disposed above said lifting arms for cooperative movement therewith in response to the operation of associated hydraulic actuating cylinders, a triangular tubular framework pivotally secured to the outstanding ends of the lifting arms, said framework including a transverse base member engaging the undersides of the lifting arms when said framework is in substantial longitudinal alignment with the lifting arms, latching means associated with the loading attachment and framework to releasably secure said framework to its longitudinally extended position, and members secured to and projecting upwardly from said base member of said framework, the lifting rods of the loading attachment being pivotally secured to the outstanding ends of said upwardly projecting members.

GERALD T. BAKER.

References Cited in the file of this patent

UNITED STATES PATENTS

| Number | Name | Date |
|---|---|---|
| 1,512,429 | Loudon | Oct. 21, 1924 |
| 1,720,714 | Bergesen, Sr. | July 16, 1929 |
| 2,301,808 | Mosher | Nov. 10, 1942 |
| 2,436,000 | Fleming | Feb. 17, 1948 |
| 2,449,146 | Ryan | Sept. 14, 1948 |
| 2,495,143 | Simmonds | Jan. 17, 1950 |
| 2,583,079 | Baker | Jan. 22, 1952 |
| 2,591,435 | Hunsaker et al. | Apr. 1, 1952 |
| 2,630,930 | Ulrich | Mar. 10, 1953 |